(12) United States Patent
Herlihy et al.

(10) Patent No.: US 8,375,062 B2
(45) Date of Patent: Feb. 12, 2013

(54) SIMPLE OPTIMISTIC SKIPLIST

(75) Inventors: Maurice P. Herlihy, Brookline, MA (US); Yosef Lev, Cambridge, MA (US); Victor Luchangco, Cambridge, MA (US); Nir N. Shavit, Cambridge, MA (US)

(73) Assignee: Oracle America, Inc., Redwood Shores, CA (US)

( * ) Notice: Subject to any disclaimer, the term of this patent is extended or adjusted under 35 U.S.C. 154(b) by 860 days.

(21) Appl. No.: 12/165,086

(22) Filed: Jun. 30, 2008

(65) Prior Publication Data

US 2009/0132563 A1 May 21, 2009

Related U.S. Application Data

(60) Provisional application No. 60/988,897, filed on Nov. 19, 2007.

(51) Int. Cl.
G06F 7/00 (2006.01)
G06F 17/30 (2006.01)

(52) U.S. Cl. .................................................... 707/800

(58) Field of Classification Search ................ 707/793, 707/797, 800
See application file for complete search history.

(56) References Cited

U.S. PATENT DOCUMENTS

| | | | | |
|---|---|---|---|---|
| 5,659,739 A * | 8/1997 | Lubbers et al. | ......................... | 1/1 |
| 5,671,406 A * | 9/1997 | Lubbers et al. | ............... | 707/696 |
| 5,924,098 A * | 7/1999 | Kluge | ................... | 1/1 |
| 7,117,502 B1 * | 10/2006 | Harris | ........................ | 719/315 |
| 7,257,711 B2 * | 8/2007 | Goodrich et al. | ............. | 713/176 |
| 7,370,054 B1 * | 5/2008 | Martin et al. | ................ | 707/747 |
| 7,424,477 B1 * | 9/2008 | Martin et al. | ........................ | 1/1 |
| 7,613,796 B2 * | 11/2009 | Harvey et al. | ................ | 709/220 |
| 2004/0107346 A1 * | 6/2004 | Goodrich et al. | ............. | 713/176 |
| 2007/0198979 A1 * | 8/2007 | Dice et al. | ..................... | 718/100 |
| 2010/0082654 A1 * | 4/2010 | Zhang et al. | .................. | 707/759 |

OTHER PUBLICATIONS

William Pugh, A Skip List Cookbook, Published Jul. 1989, UMIACS-TR-89-72.1.*
Keir Fraser, Practical lock-freedom, Technical Report No. 579, University of Cambridge Computer Laboratory, published 2004.*
Steve Heller et al., A Lazy Concurrent List-Based Set Algorithm, Published 2005.
William Pugh, Skip Lists: A Probabilistic Alternative to Balanced Trees, Published 1990.
William Pugh et al., Concurrent Maintenance of Skip Lists, Apr. 1989, UMIACS-TR-90-80, CS-TR-2222.1.

* cited by examiner

*Primary Examiner* — Jeffrey A Burke
(74) *Attorney, Agent, or Firm* — Park, Vaughan, Fleming & Dowler LLP

(57) ABSTRACT

Apparatus, methods, and computer program products are disclosed for concurrently searching a memory containing a skiplist data structure. The method locates the skiplist data structure in the memory. The skiplist data structure includes a plurality of linked lists related by a skiplist invariant. Furthermore, the plurality of linked lists includes a first-level linked list and one or more higher-level linked lists. The skiplist data structure also includes a plurality of nodes, each of which includes a key field, at least one pointer field, and a lock field, respectively. Each of the plurality of nodes is linked to the first-level linked list through the at least one pointer field and ordered responsive to the key field. The method performs a search operation on the skiplist data structure, while the skiplist data structure is subject to concurrent alteration of the plurality of nodes by a plurality of execution threads that are configured to maintain the skiplist invariant and returns a result of the search operation.

16 Claims, 6 Drawing Sheets

SIMPLE OPTIMISTIC SKIPLIST

RELATED APPLICATIONS

This application claims the benefit of U.S. Provisional Application No. 60/988,897, filed: 19 Nov. 2007, entitled A SIMPLE OPTIMISTIC SKIPLIST ALGORITHM, with first named inventor: Maurice P. Herlihy, which is hereby incorporated by reference in its entirety.

BACKGROUND

1. Technical Field

The disclosed technology relates to the field of data structures used by computer systems.

2. Related Art

FIG. 1 illustrates a skiplist data structure 100 as is commonly understood by one skilled in the art. The skiplist data structure 100 is a collection of sorted linked lists, each at a given "level," that mimics the behavior of a search tree. A skiplist usually is bounded by a left-sentinel node 103 and a right-sentinel node 104, each of which has a maximum level 105. The maximum level 105 for the skiplist data structure 100 is 4. The skiplist data structure 100 contains a level-1 list 107, a level-2 list 109, a level-3 list 111, and an empty level 4 list 113. For a non-empty skiplist, the level-1 list 107 links a number of nodes (such as a level-1 node 115) in key-sort order. The skiplist data structure 100 also contains a level-2 node 117 and a level-3 node 119. These nodes are data nodes that contain key information, metadata about the node, and links for each level of the skiplist to which the data node is linked. The highest skiplist level to which the node is linked is the node's topLevel value. One skilled in the art will understand that in some equivalent embodiments, a skiplist node can be split to multiple nodes (or sub-nodes), one in each level, where a (sub)node in each level points to the (sub)node in the level beneath it, in addition to the succeeding node in the same level.

The list at each level, other than the bottom level, is a sublist of the list at the level beneath it. Each node is assigned a random level, up to the maximum skiplist level, and participates in the lists up to that level. The number of nodes in each list decreases exponentially with the level, implying that a key can be quickly found by searching first at higher levels, skipping over large numbers of shorter nodes, and progressively working downward until a node with the desired key is found, or the bottom level is reached. Thus, the expected time complexity of skiplist operations is logarithmic in the length of the list.

The left-sentinel node 103 and the right-sentinel node 104 have the maximum allowed level, and initially, when the skiplist is empty, the right-sentinel node 104 is the successor of the left-sentinel node 103 at every level. The key for the left-sentinel node 103 is smaller, and the key for the right-sentinel node 104 is greater, than any key that may be added to the skiplist. Searching the skiplist thus always begins at the left-sentinel node 103.

Skiplists are an increasingly important data structure for storing and retrieving ordered in-memory data. Because of their highly distributed nature and the lack of global rebalancing, skiplists are an important logarithmic search structure for concurrent applications. Unfortunately, none of the concurrent skiplist implementations in the literature, whether lock-based or lock-free, has been proven correct. Moreover, the complex structure of these algorithms is a barrier to software designers who wish to extend and modify the algorithms or base new structures on them.

"Lock-freedom" is a progress characteristic that guarantees that if some threads are executing method calls, and at least one thread continues taking steps, then at least one thread will complete its call. It guarantees that the system as a whole continues to make progress, but makes no progress guarantee for any individual thread. "Wait-freedom" is a stronger progress characteristic that guarantees that any thread that continues taking steps in executing a method call, will eventually complete the call. One skilled in the art of concurrent programming would understand that the lock-free characteristic as applied to an operation on a data structure specifies that locks on the data structure are not used for that operation while still enabling other concurrent operations (some of which may use locks) on the data structure. However, as that operation detects concurrent modifications to the data structure, it may need to restart. Thus, if contention is high enough, that operation may not timely complete, and the thread that invoked the operation will wait. An operation that has the wait-free condition will complete without retry and without waiting for any locks.

The original lock-based concurrent skiplist implementation by William Pugh, "Concurrent Maintenance of skip lists," 1990, is rather complex due to its use of pointer-reversal. The inventors do not know of a correctness proof for this implementation.

The ConcurrentSkipListMap implementation released as part of the Java® SE 6 platform, is the most effective concurrent skiplist implementation known to the inventors. This algorithm is lock-free, and performs well in practice. Its principal limitation is that it is too complicated and certain thread interleavings can cause the usual skiplist invariants (that is, that each list is a sublist of its immediate lower-level list) to be violated, sometimes transiently, and sometimes indefinitely. These violations do not seem to affect performance or correctness, but they make it difficult to reason about the algorithm. In particular, after linking a node in the bottom layer, an add operation links the node in the rest of the layers from top to bottom. This can result in a state of a node that is linked only in its top and bottom layers, so that the list at the top layer is not a sublist of the list at the layer immediately beneath it. Moreover, attempts to link in a node at any layer other than the bottom are not retried, and hence this state of nonconformity to the skiplist structure can persist indefinitely.

One skilled in the art will understand that concurrent linked-list algorithms exist that use optimistic fine-grained locking for the add and remove operations, and a wait-free contains operation (Heller et al., "A Lazy Concurrent List-Based Set Algorithm," Proceedings of 9th International Conference on Principles of Distributed Systems, 2005). However, such algorithms rely on the nodes in the list having only one link for the list. If there are multiple list-links (as in a skiplist node), the difficulty of maintaining the skiplist invariants in a concurrent access environment is more complex.

It would be advantageous to provide an efficient, concurrent skiplist algorithm having a contains operation that has the wait-free characteristic.

DETAILED DESCRIPTION

Figure 1:
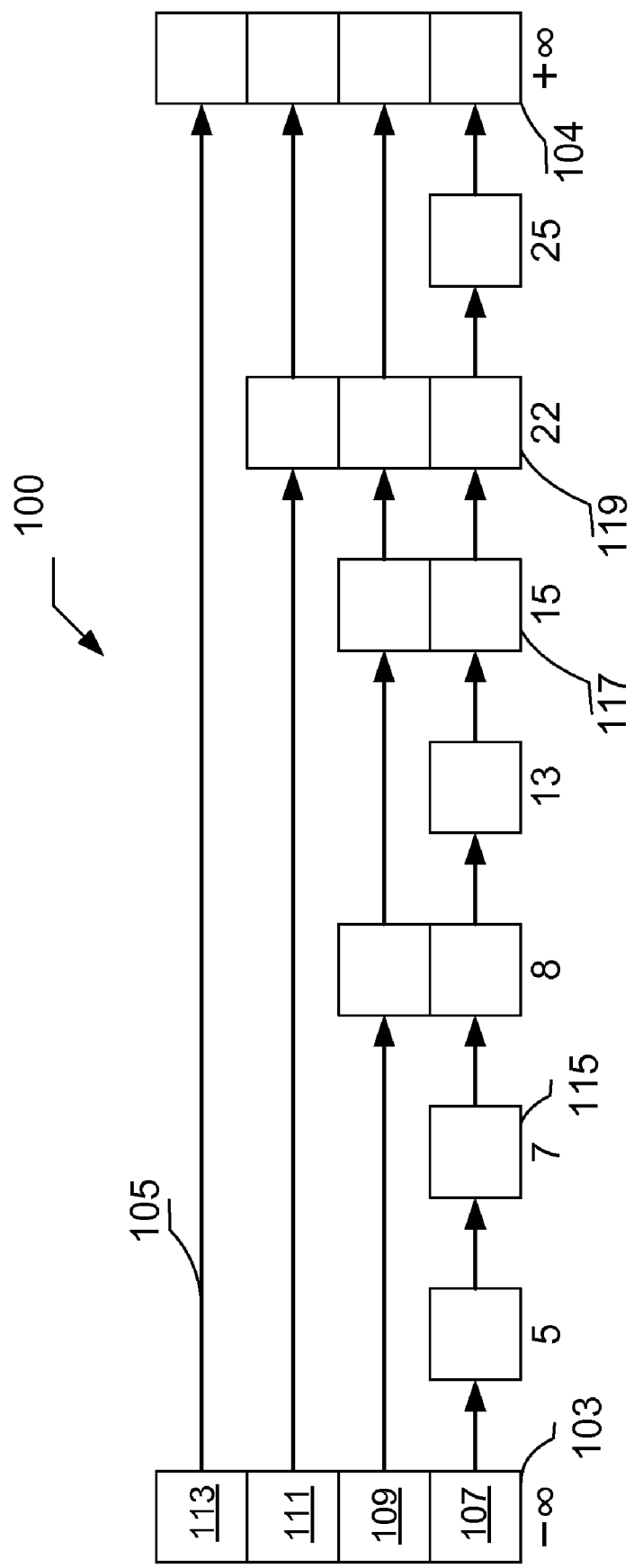
FIG. 1 illustrates an example skiplist data structure.

The technology disclosed herein teaches a computer-controlled method for concurrently searching a memory containing a skiplist data structure. The method locates the skiplist data structure in the memory. The skiplist data structure includes a plurality of linked lists related by a skiplist invariant. Furthermore, the plurality of linked lists includes a first-level linked list and one or more higher-level linked lists. The skiplist data structure also includes a plurality of nodes, each of which includes a key field, at least one pointer field, and a lock field, respectively. Each of the plurality of nodes is linked to the first-level linked list through the at least one pointer field and ordered responsive to the key field. The method performs a search operation on the skiplist data structure, while the skiplist data structure is subject to concurrent alteration of the plurality of nodes by a plurality of execution threads that are configured to maintain the skiplist invariant and returns a result of the search operation. Apparatus that perform the method, and program products that contain computer instructions that, when executed by the computer, cause the computer to perform the method, are also disclosed.

The following are provided to assist in the understanding of the present technology and embodiments thereof.

Data Structure—A data structure is an ordered arrangement of storage in memory for variables. A data structure can be part of an object defined with respect to an object-oriented programming paradigm. A data structure can also reside in the computer's memory and/or on a file system.

Object—An object in the object-oriented programming paradigm is an association between programmed methods and the data structures defined by a class and the instantiated storage that represents an object of the class.

Pointer—A pointer is a data value that is used to reference a data structure or an object. One skilled in the art will understand that "pointer" includes, without limitation, a memory address to, or a value used to calculate the address to the information of interest and any functional equivalents including handles and similar constructs.

Programmed method—A programmed method is a programmed procedure associated with an object. The programmed method is invoked to cause the object to perform an operation. In the procedural programming paradigm, a programmed method is equivalent to a programmed routine or function.

Procedure—A procedure is a self-consistent sequence of steps that can be performed by logic implemented by a programmed computer, specialized electronics or other circuitry or a combination thereof that lead to a desired result. These steps can be defined by one or more computer instructions. These steps can be performed by a computer executing the instructions that define the steps. Further, these steps can be performed by circuitry designed to perform the steps. Thus, the term "procedure" can refer (for example, but without limitation) to a sequence of instructions, a sequence of instructions organized within a programmed-procedure or programmed-function, a sequence of instructions organized within programmed-processes executing in one or more computers, or a sequence of steps performed by electronic or other circuitry, or any logic or combination of the foregoing. In particular, the methods, programmed methods and processes described herein can be implemented with logics such as, for example but without limitation, a locator logic, a search logic, a return logic and an add logic, etc.

One skilled in the art will understand that although the following description of the technology is cast within an object-oriented paradigm, the techniques disclosed are applicable to other programming paradigms.

Figure 2:
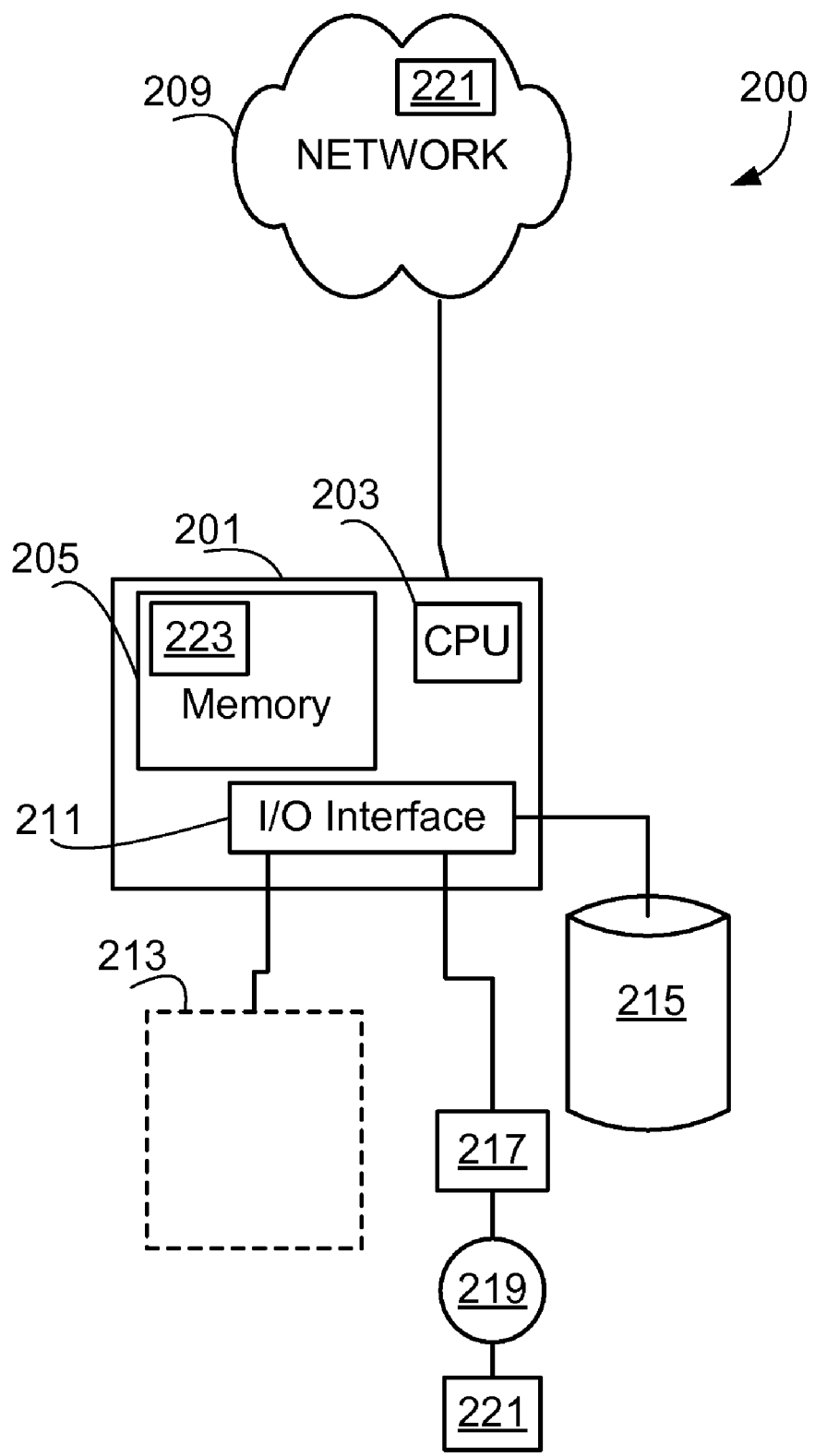
FIG. 2 illustrates a multi-processor, shared memory computer system that can incorporate the technology disclosed herein.

FIG. 2 illustrates a computer system 200 that can incorporate the technology described herein. The computer system 200 includes a computer 201 that incorporates a multi-core CPU 203, a shared memory 205 that can be accessed by each of the processors in the multi-core CPU 203, and a network interface (not shown). The network interface provides the computer 201 with access to a network 209. The shared memory 205 can be any technology that enables multiple processors to interleave read and write accesses to the memory. It is random access in the sense that any piece of data can be returned in constant time, regardless of the data's physical location and whether or not the returned data is related to the previous piece of data. Such memory can be Core, SRAM, DRAM, EPROM, EEPROM, NOR FLASH, etc. The computer 201 also includes an I/O interface 211 that can be connected to an optional user interface device(s) 213, a storage system 215, and a removable data device 217. The removable data device 217 can read a computer-usable data carrier 219 (such as a fixed or replaceable ROM within the removable data device 217 itself (not shown); as well as a computer-usable data carrier that can be inserted into the removable data device 217 itself (such as a memory stick, CD, floppy, DVD or any other tangible media)) that typically contains a program product 221. The user interface device(s) 213 can include a display device(s) and user input devices (not shown). The storage system 215 (along with the removable data device 217), the computer-usable data carrier 219, and (in some cases the network 209) comprise a file storage mechanism. The program product 221 on the computer-usable data carrier 219 can be read into the shared memory 205 or non-shared memory as a program 223 which instructs the multi-core CPU 203 to perform specified operations. In addition, the program product 221 can be provided from devices accessed using the network 209. One skilled in the art will understand that the network propagates information (such as data that defines a computer program). Signals can be propagated using electromagnetic signals, visible or invisible light pulses, signals on a data bus, or signals transmitted over any wire, wireless, or optical fiber technology that allows information to be propagated from one point to another. Programs and data are commonly read from both tangible physical media (such as those listed above) and from the network 209. Thus, the network 209, like a tangible physical media, can be a computer-usable data carrier. One skilled in the art will understand that not all of the displayed features of the computer 201 need to be present for all embodiments that implement the techniques disclosed herein. In addition, such a one will understand that the technology disclosed herein will also apply to SMP systems where the processors are separate so long as the processors are in communication with, and share access to, the shared memory 205. Further, one skilled in the art will understand that the technology disclosed herein can also be used with a single CPU or a single-core CPU and non-shared memory, and that computers are ubiquitous within modern devices ranging from cell phones to vehicles to kitchen appliances, etc.

The computer system 200 is but one example where the technology disclosed herein can be used. Other examples include massive multiprocessor systems that can have processor dedicated memory and at least one shared memory that is tightly coupled between some or all of the processors in the massive multiprocessor system.

The technology disclosed herein is a new high performance, lock-based concurrent skiplist algorithm. Herein the term "algorithm" means any computer-executed process involved with the search and modification of a skiplist that can reside in the computer's memory or file storage. In addition, while the algorithm can be used with a single thread of execution, the algorithm can also be used with threads that are concurrently executing on one or more computers or processing units and accessing a shared memory or storage that contains the skiplist.

This algorithm uses concepts from Heller et al.'s lazy-list algorithm. However, one skilled in the art, prior to reading the descriptions herein, would not understand how to maintain the skiplist invariants when using these concepts.

Included herein is a listing of C++ pseudocode that represents one embodiment of the disclosed technology; while the figures are illustrative, the pseudocode teaches one embodiment to one skilled in the art. Other embodiments can be implemented differently. The pseudocode is presented within an object-oriented programming paradigm.

The concurrent lock-based skiplist algorithm is described herein in the context of an implementation of a set object that supports three programmed methods, add, remove and contains: add (v) adds v to the set and returns true if and only if v was not already in the set; remove (v) removes v from the set and returns true if and only if v was in the set; and contains (v) returns true if and only if v is in the set. A search operation is the generic term for the contains operation. One skilled in the art would understand how to implement a corresponding map object.

The disclosed lock-based algorithm combines two complementary techniques. First, the algorithm is optimistic: the programmed methods traverse the list without acquiring locks. Moreover, they are able to ignore locks acquired by other threads while the list is being traversed. Only when a programmed method finds the node(s) it is seeking does it lock the node and its predecessors, and then it validates that these nodes are unchanged. Second, the algorithm is lazy: removing an item involves logically deleting it by marking it before it is physically removed (unlinked) from the list. This is accomplished while maintaining the skiplist invariants and sparingly using locks.

The key of each node is strictly greater than the key of its predecessor. In the described embodiment each node has a marked flag, which is used to make remove operations appear atomic. A skiplist may need to link the node in at several levels, and thus cannot insert such a node using a single atomic instruction. To address this issue, each node includes a fullyLinked flag that is set to true after a node has been linked-in at all its levels; setting fullyLinked is the linearization point of a successful add operation. Pseudocode lines 4-11 demonstrates one embodiment of a node. One skilled in the art will understand that a node can also include or reference additional data such as coordination information, object references, data values, etc.

A key is in the abstract set if and only if there is an unmarked, fully linked node with that key in the list (that is, reachable from the left-sentinel).

To maintain the skiplist invariant—that is, that each list is a sublist of the next lower list—changes are made to the list structure (that is, the nexts pointers) only when locks are acquired for all nodes that need to be modified. (There is one exception to this rule involving the add operation, subsequently discussed.)

In the following detailed description of the algorithm, we assume the existence of a garbage collector to reclaim nodes that are removed from the skiplist, so nodes that are removed from the list are not recycled while any thread might still access them. One skilled in the art will understand that other solutions exist to achieve the same effect in runtime environments without garbage collection. The following description of the algorithm assumes that keys are integers from MinInt+1 to MaxInt−1. We use MinInt and MaxInt as the keys for LSentinel and RSentinel, which are the left and right sentinel nodes respectively. One skilled in the art after reading the description herein would be able to extend the disclosed algorithm to keys of other types without undue experimentation.

Figure 3:
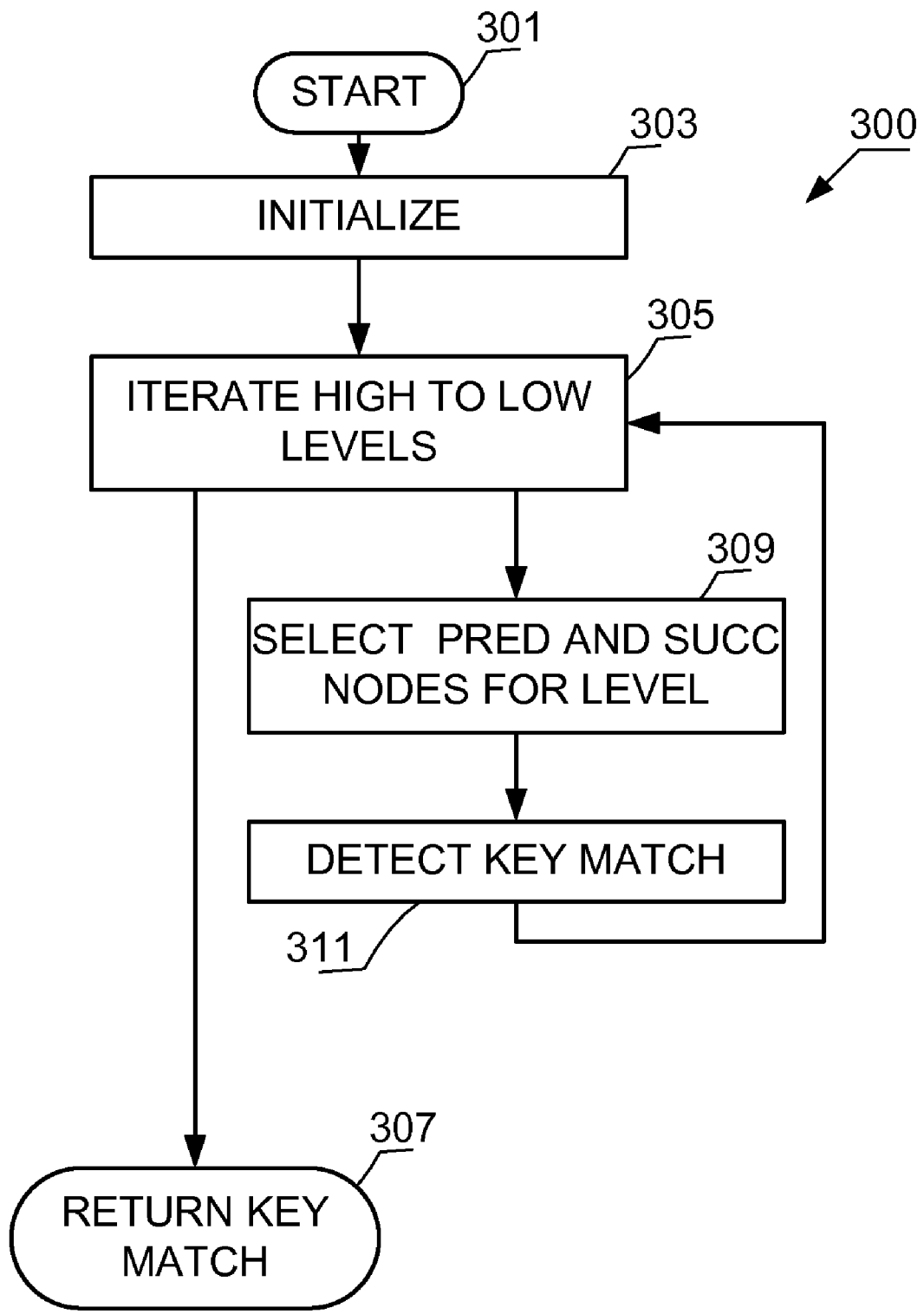
FIG. 3 illustrates a findnode helper process.

FIG. 3 illustrates a findnode helper process 300 that searches the skiplist (see: pseudocode lines 33-52). The findnode helper process 300 initiates at a start terminal 301 with a sought-after key v and two maximal-level arrays preds and succs of node pointers as parameters. The findnode helper process 300 initializes at an 'initialization' procedure 303 and continues to an 'iterate levels' procedure 305 that iterates from the highest skiplist level to the lowest. When all of the skiplist levels have been iterated, the findnode helper process 300 completes through a 'return result' terminal 307 that returns the skiplist level where the sought-after key was found, or −1 if the sought-after key was not found. On return the preds and succs arrays have been filled. On each iteration, a 'capture pred and succ nodes for level' procedure 309 captures the preceding and successor nodes for the sought-after key at that level, and a 'detect key match' procedure 311 detects whether the sought-after key has been found. Thus, the findnode helper process 300 searches exactly as in a sequential (non concurrent) skiplist, starting at the highest level and proceeding to the next lower level each time it encounters a node whose key is greater than or equal to v. The thread records in the preds array the last node with a key less than v that it encountered at each level, and that node's successor (which must have a key greater than or equal to v) in the succs array. If it finds a node with the sought-after key, findNode returns the index of the first level at which such a node was found; otherwise, it returns −1 (or other value that does not represent a level in the skiplist). One skilled in the art will understand that, while FIG. 3 illustrates an implementation that continues to the bottom level (even if it finds a node with the sought-after key at a higher level) such that all the entries in both preds and succs arrays are filled in after findNode terminates, this can be optimized to complete once the sought-after key is found. Such a one will also note that the findnode helper process 300 does not acquire any locks, does not require synchronization of threads, nor does it retry in case of conflicting access with some other thread.

Figure 4:
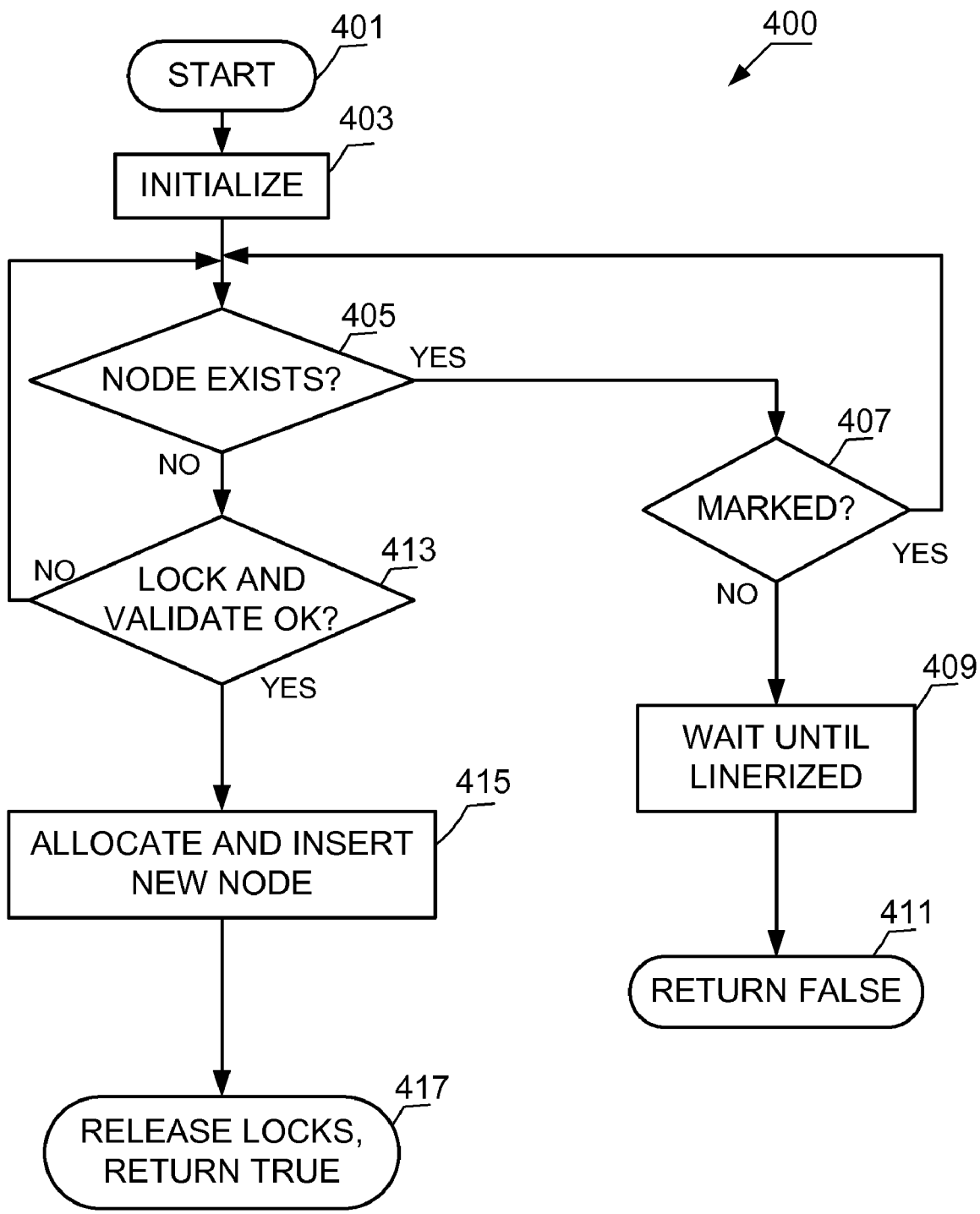
FIG. 4 illustrates a concurrent skiplist add process.

FIG. 4 illustrates a concurrent skiplist add process 400 (pseudocode lines 54-99) that initiates at a start terminal 401 and continues to an 'initialization' procedure 403 that selects which level (topLevel) of the skiplist to insert the new node (pseudocode line 55). A 'node exists' decision procedure 405 calls findNode to determine whether a node with the key is already in the skiplist. If such a node is found, a 'marked node' decision procedure 407 determines whether the node is marked. If the node is marked, then some other thread is in the process of deleting that node, so the thread doing the add operation retries by branching back to the 'node exists' decision procedure 405. However, if the node is not marked, the concurrent skiplist add process 400 continues to a 'wait until linearized' procedure 409 so that if the node is not yet fully linked the thread will wait until it is (because the key is not in the abstract set until the node is fully linked (pseudocode lines 59-66)). Once the node is linearized, the concurrent skiplist add process 400 continues to a 'return false' terminal 411 to indicate that the node already exists in the skiplist.

The topLevel value can be determined using a random-Level function that for example, returns 0 with probability ¾, i with probability $2^{-(i+2)}$ for i∈[1,30], and 31 with probability $2^{-32}$ as is known to one skilled in the art of skiplists.

If no node was found with the specified key, the concurrent skiplist add process 400 continues to a 'lock and validate' decision procedure 413 that locks and validates all the predecessors returned by findnode from the bottom level of the skiplist up to topLevel (pseudocode lines 69-84). For each level i≦topLevel, validation (pseudocode lines 81-82) checks that preds [i] and succs [i] are still adjacent at level i, and that neither is marked. If validation fails, the thread has encountered a conflicting operation, so it releases the locks it acquired (in the finally block (pseudocode line 97 and 22-31)) and retries back to the 'node exists' decision procedure 405.

If the thread successfully locks and validates the results of findnode up to the topLevel for the new node, then the add operation is guaranteed to succeed because the thread holds all the locks until it fully links its new node. Thus, the concurrent skiplist add process 400 continues to an 'allocate and insert new node' procedure 415 to allocate a new node with the appropriate key and level, links the new node into the skiplist, and sets the fullyLinked flag of the new node (this is the linearization point of the add operation (pseudocode line 94)). Then the concurrent skiplist add process 400 continues to a 'return true' terminal 417 that returns true after releasing the locks (pseudocode lines 86-97) set by the 'lock and validate' decision procedure 413.

Note that linking the new node into the skiplist is done in bottom to top order to maintain the skip-list invariant; and that a link established in a lower level list will not be removed while links in higher levels are established because the 'lock and validate' decision procedure 413 acquired the lock on all the predecessors and the concurrent skiplist add process 400 continues to hold these locks until the links to the new node are established for each level of the new node. The thread writing newNode→nexts [i] (pseudocode line 90) is the one case in which a thread modifies the nexts field for a node it has not locked. This case is safe because newNode will not be linked into the list at level i until the thread sets preds [i]→nexts [i] to newNode (pseudocode line 91), after it writes newNode→nexts [i].

Figure 5:
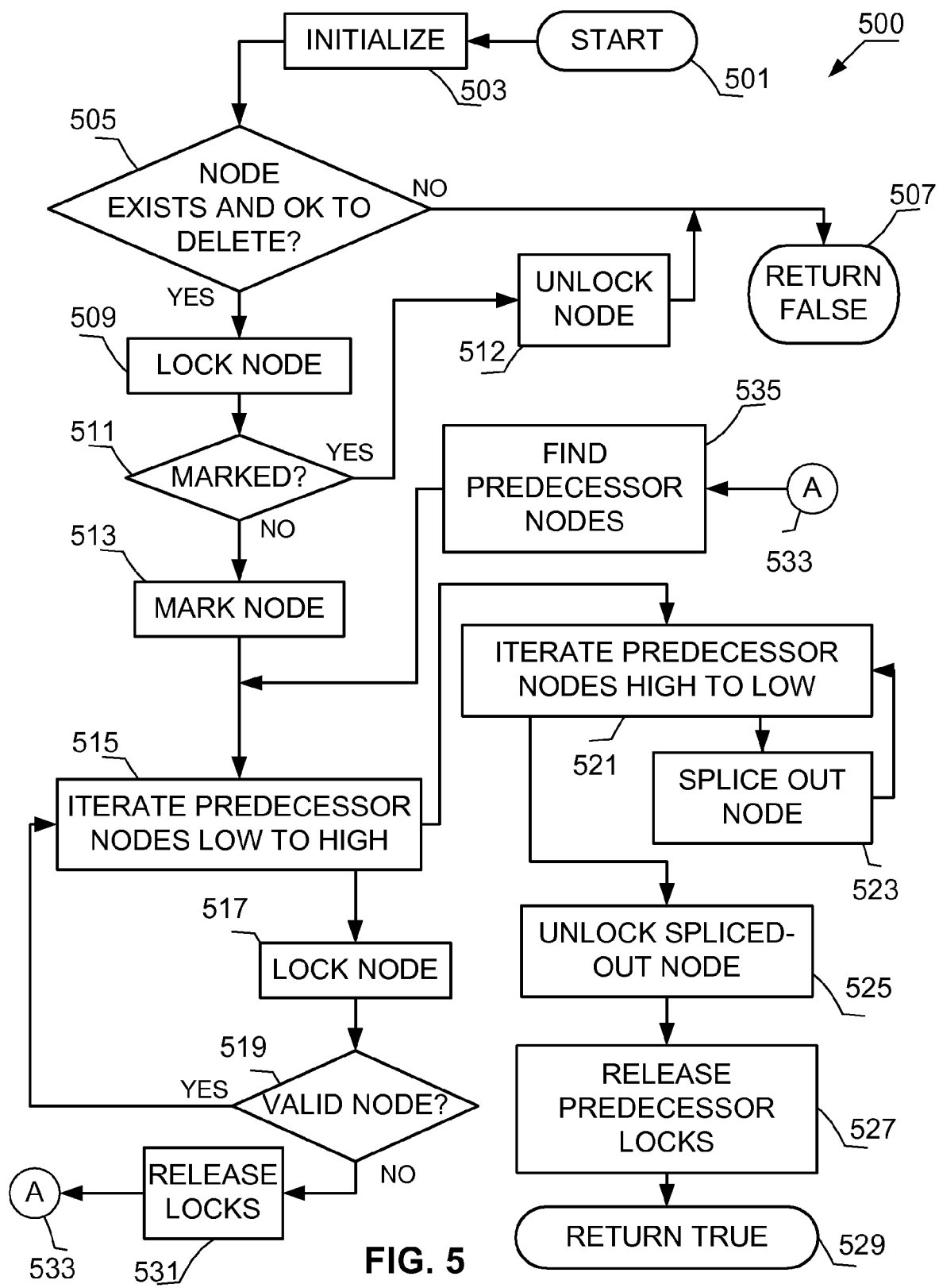
FIG. 5 illustrates a concurrent skiplist remove process.

FIG. 5 illustrates a concurrent skiplist remove process 500 (pseudocode lines 101-150) that initiates at a start terminal 501, continues to an 'initialize' procedure 503 to perform initialization, and then to a 'node exists and OK to delete' decision procedure 505 that calls findNode to determine whether a node with the searched-for key is in the skiplist, and if so, whether the node is "okay to delete" (pseudocode lines 152-156), which means the node is fully linked, not marked, and was found at its top level.

If no node was found, or the node found was not "okay to delete" (that is, was marked, not fully linked, or not found at its top level), then the concurrent skiplist remove process 500 continues to a 'return false' terminal 507 (pseudocode line 148). A node found that is not in its top level was either not yet fully linked, or marked and partially unlinked, at some point when the thread traversed the list at that level (some implementations could have continued with the remove operation, but the subsequent validation would fail). Note that if the node is not marked, that for any key there is at most one node with that key in the skiplist (that is, reachable from the left sentinel) at any time, and once a node is put in the skiplist (which it must have been to be found by findNode), the node will not be removed until it is marked. Also note that if the node is marked, at the time the node was found it might not be in the skiplist, and some unmarked node with the same key may be in the skiplist. In such a case it can be shown that there must have been some time during the execution of the remove operation at which the key was not in the abstract set.

If the 'node exists and OK to delete' decision procedure 505 locates a node with the searched-for key that is "ok to delete," the thread locks the node at a 'lock node' procedure 509 and verifies that it is still not marked at a 'marked?' decision procedure 511. If the node is not marked, the thread marks the node at a 'mark node' procedure 513, which logically deletes the node (pseudocode lines 111-121); that is, the marking of the node is the linearization point of the remove operation, and the deleted node while still linked in the skiplist will no longer be found by the contains operation. However, if the node is marked (hence deleted from the abstract set), the concurrent skiplist remove process 500 continues to an 'unlock node' procedure 512 that unlocks the node and continues to the 'return false' terminal 507 as the abstract set does not contain a node with the searched-for key.

The rest of the procedure accomplishes the "physical" deletion, removing the deleted node from the list by first locking its predecessors at all levels up to the level of the deleted node (pseudocode lines 124-137) from the lowest level of the skiplist to the highest level of the deleted node, and splicing the deleted node out of the skiplist one level at a time (pseudocode lines 140-142).

An 'iterate predecessor nodes low-to-high' procedure 515 iterates the predecessor nodes from the lowest level to the highest level of the deleted node. For each iterated predecessor, a 'lock node' procedure 517 locks the predecessor node and a 'valid node' decision procedure 519 determines whether the locked predecessor node is still valid. If the locked predecessor node is still valid, the concurrent skiplist remove process 500 continues back to the 'iterate predecessor nodes low-to-high' procedure 515 until all predecessor nodes are locked and validated. Here, the predecessor node is "valid" if it is unmarked and still points to the node being removed (note that this is different than validation of the 'lock and validate' decision procedure 413 where the node is "valid" if the predecessor points to the successor and both are be unmarked).

To maintain the skiplist structure, the deleted node is spliced out of higher levels before being spliced out of lower ones (though, to ensure freedom from deadlock, the locks are acquired in the opposite order, from lower levels up to match the order in which nodes are locked by the concurrent skiplist add process 400). Thus, once the predecessor nodes are locked and validated, the concurrent skiplist remove process 500 continues to an 'iterate predecessor nodes high-to-low' procedure 521 that iterates the deleted node's predecessor nodes from the highest level of the deleted node to the lowest level of the skiplist. As each predecessor node is iterated, a 'splice-out node' procedure 523 splices out the deleted node from that level of the skiplist. Once the deleted node is spliced out of the skiplist, an 'unlock spliced-out node' procedure 525 unlocks the deleted node, a 'release predecessors locks' procedure 527 releases the locks set by the 'lock node' procedure 517, and the concurrent skiplist remove process 500 successfully returns through a 'return true' terminal 529.

As in the concurrent skiplist add process 400, before changing any of the deleted node's predecessors, the concurrent skiplist remove process 500 validates that those nodes are indeed still the deleted node's predecessors at the 'valid node' decision procedure 519.

If the validation fails, then the thread releases the locks on the old predecessors (but not the deleted node) at a 'release locks' procedure 531 and the concurrent skiplist remove process 500 continues via a 'retry continuation A' terminal 533

(because the local isMarked flag has been set) to a 'find predecessor nodes' procedure 535 that finds the new predecessors of the deleted node by calling findNode again, and the 'iterate predecessor nodes low-to-high' procedure 515 restarts to lock and validate the predecessor nodes as previously described.

Figure 6:
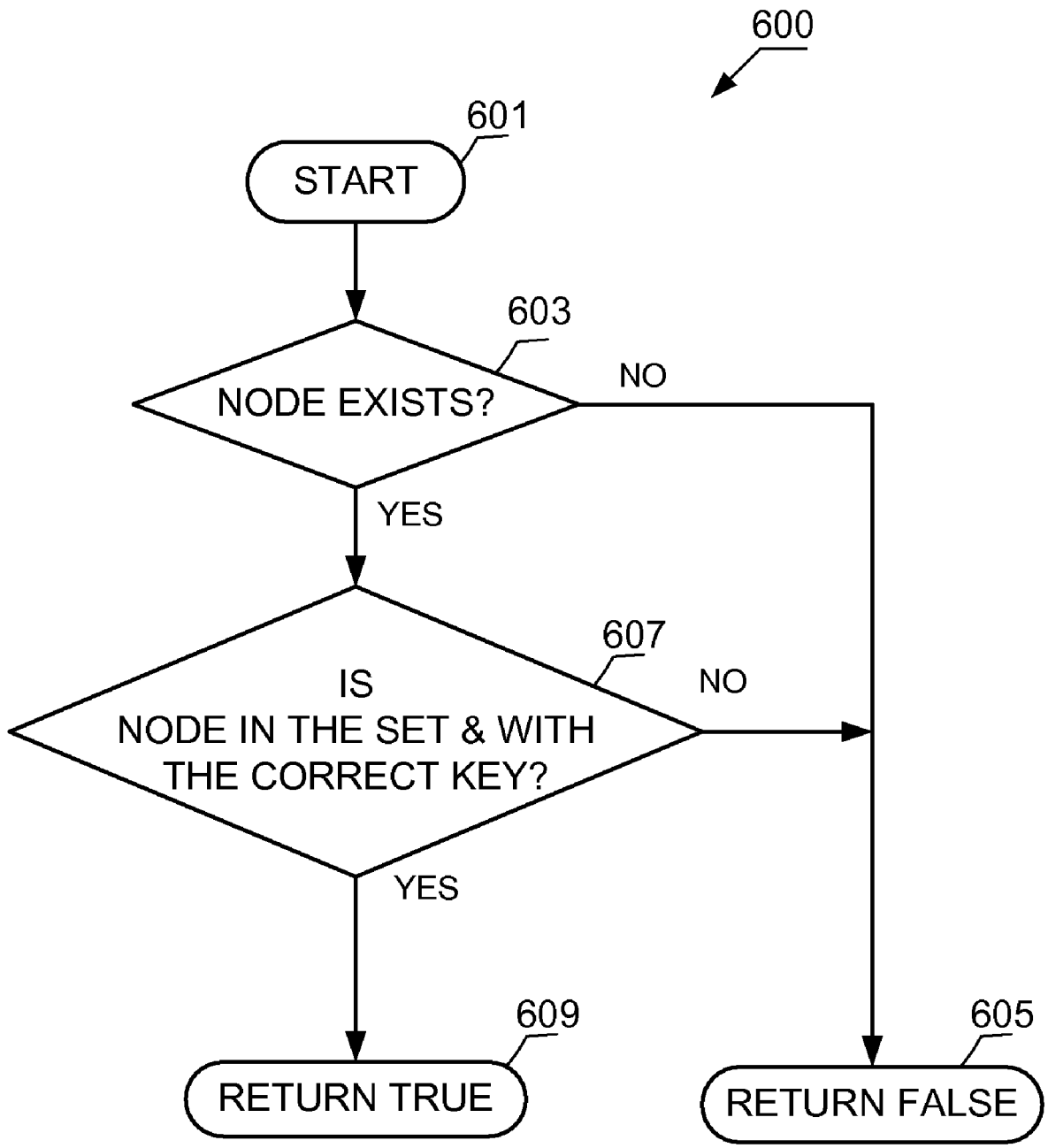
FIG. 6 illustrates a concurrent skiplist contains process.

FIG. 6 illustrates a concurrent skiplist contains process 600 (pseudocode lines 158-164) that initiates at a start terminal 601 and continues to a 'node exists' decision procedure 603 that calls findNode. If no node is found, the concurrent skiplist contains process 600 continues to a 'return false' terminal 605 that returns false. If the node is found, a 'node in set' decision procedure 607 determines if the found node is unmarked, fully linked and has the appropriate key. If so, the concurrent skiplist contains process 600 continues to a 'return true' terminal 609 that returns true. Note that if the 'node in set' decision procedure 607 finds such a node, then, by definition, the key is in the abstract set. If the 'node in set' decision procedure 607 determines that the found node is marked, not fully linked, or does not have the appropriate key, the concurrent skiplist contains process 600 continues to the 'return false' terminal 605. Note that this contains (search) operation is wait-free because it does not acquire any locks, nor does it ever retry; it searches the list only once.

The pseudocode was designed to promote understanding and ease of discussion/analysis. One skilled in the art would understand that the pseudocode as implemented would likely have efficiency improvements. Such improvements can include:

1) If a node with an appropriate key is found, the add and contains operations need not look further; they only need to ascertain whether that node is fully linked and unmarked. If so, the contains operation can return true and the add operation can return false. If not, then the contains operation can return false, and the add operation either waits before returning false (if the node is not fully linked) or else must retry.

2) The remove operation does not need to search to the bottom level to find all the predecessors of the node to be deleted; however, once it finds and marks the node at some level, it can search for that exact node at lower levels rather than comparing keys (This works because once a thread marks a node, no other thread can unlink it).

3) findNode need not always search from the highest possible level. The highest non-empty level can be tracked because whenever that changes, the thread that causes the change must have the left-sentinel node locked (and hence this lock can be used to protect a shared variable indicating the highest non empty skiplist level).

Note that the key of a node never changes (that is, key=k is stable), and the marked and fullyLinked fields of a node are never set to false (thus, marked and fullyLinked are stable). Though initially null, nexts [i] is never written to null (so nexts [i]≠null is stable). Also, a thread writes a node's marked or nexts fields only if it holds the node's lock (with the one exception of an add operation writing nexts [i] of a node before linking it in at layer i). A thread holds a lock only if inside the try block after locking, or if the node is to be deleted (nodeToDelete) and either is marked, or in that block where the thread marks the node.

One skilled in the art, from these observations and by inspection of the code, will understand that in any operation, after calling findNode, we have preds [i]→key<v and succs [i]→key≧for all i, and succs [i]→key>v for i>lFound (the value returned by findnode). Also, for a thread in the concurrent skiplist remove process 500, nodeToDelete is only set once, and that unless that node was marked by some other thread, this thread will mark the node; thereafter, until it completes the operation, the thread's isMarked variable will be true. We also know by okToDelete that the node is fully linked (and indeed that only fully linked nodes can be marked). Furthermore, the requirement to lock nodes before writing them ensures that after successful validation, the properties checked by the validation (which are slightly different for add and remove) remain true until the locks are released.

It can be proven that the only action that adds a node to a list at any level is the setting of the node's fullyLinked flag (pseudocode line 94). Furthermore, it can be proven that if a thread finds a marked node, then the key of that node must have been absent from the list at some point during the execution of the thread's operation. There are two cases: If the node was marked when the thread invoked the operation, the node must have been in the skiplist at that time, because marked nodes cannot be added to the skiplist (only a newly allocated node can be added to the skiplist), and because no two nodes in the skiplist can have the same key, no unmarked node in the skiplist has that key. Thus, at the invocation of the operation, the key is not in the skiplist. On the other hand, if the node was not marked when the thread invoked the operation, then it must have been marked by some other thread before the first thread found it. In this case, the key is not in the abstract set immediately after the other thread marked the node.

The algorithm guarantees that the skiplist invariants are preserved at all times. By "skiplist invariant," we mean that the list at each layer is a sublist of the lists at lower layers. It is important to preserve this structure, as skiplist complexity analysis requires it. One skilled in the art will understand that the disclosed algorithm preserves the skiplist structure by realizing that linking new nodes into the skiplist always proceeds from bottom to top, and while holding the locks on all the soon-to-be predecessors of the node being inserted. On the other hand, when a node is being removed from the list, the higher layers are unlinked before the lower layers, and again, while holding locks on the node being removed and all its immediate predecessors.

One skilled in the art will understand that the network carries information (such as informational data, as well as data that defines a computer program). The information can also be propagated using a carrier-wave. Signals capable of propagating the information includes electromagnetic signals, visible or invisible light pulses, signals on a data bus, or signals propagated over any wire, wireless, or optical fiber technology that allows information to be transmitted over a network. Programs and data are commonly read from both tangible physical media (such as a compact, floppy, or magnetic disk) and from a network. Thus, the network, like a tangible physical media, can be a computer-usable data carrier.

One skilled in the art will understand that the technology disclosed herein is a new high-performance, lock-based concurrent skiplist algorithm.

From the foregoing, it will be appreciated that the disclosed concurrent lock-based skiplist algorithm has (without limitation) the following advantages:

1) The algorithm is simpler than other concurrent skiplist algorithms and thus is easier to reason about. Because the algorithm is simpler to reason about it is also simpler to modify when needed.

2) The disclosed concurrent lock-based skiplist algorithm preserves the skiplist properties at all times. This facilitates reasoning about the algorithm's correctness and performance.

3) Though it is lock-based, the algorithm is highly scalable due to a novel use of optimistic synchronization: it searches without acquiring locks, requiring only a short lock-based validation before adding or removing nodes.

4) The algorithm performs as well as the best previously known lock-free algorithm under the most common search patterns.

5) The algorithm implements a linearizable set (in that every operation on the skiplist appears to take place atomically at some point (the linearization point) between the programmed method invocation and response).

6) The algorithm's contains operation is wait-free (because it does not acquire any locks and never retries, and it searches the list only once).

7) The algorithm is deadlock-free because a thread always acquires locks on nodes with larger keys first. More precisely, if a thread holds a lock on a node with key v, then it will not attempt to acquire a lock on a node with key greater than or equal to v.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The following is the pseudocode for the described algorithm:

```
1    class LazySkipList {
2
3      int MaxHeight = 32;
4      class Node {
5        int key;
6        int topLevel;
7        Node* nexts[ ];
8        bool marked;
9        bool fullyLinked;
10       Lock lock;
11     };
12
13     Node LSentinel;
14     Node RSentinel;
15
16     LazySkipList( ):LSentinel(MinInt,MaxHeight),RSentinel(MaxInt,MaxHeight){
17       for (int i = 0; i < MaxHeight; i++) {
18         LSentinel.nexts[i] = &RSentinel;
19       }
20     }
21
22     void unlock(Node* preds[ ], int highestLocked) {
23       Node *pred, *prevUnlocked = null;
24       for (int level = 0; level < highestLocked; level++) {
25         pred = preds[level];
26         if (pred != prevUnlocked) {
27           pred->lock.unlock( );
28           prevUnlocked = pred;
29         }
30       }
31     }
32
33     int findNode(int v,
34                  Node* preds[ ],
35                  Node* succs[ ]) {
36       int lFound = −1;
37       Node* pred = &LSentinel;
38       for (int level = MaxHeight−1;
39            level >= 0;
40            level−−) {
41         Node* curr = pred->nexts[level];
42         while (v > curr->key) {
43           pred = curr; curr = pred->nexts[level];
44         }
45         if (lFound == −1 && v == curr->key) {
46           lFound = level;
47         }
48         preds[level] = pred;
49         succs[level] = curr;
50       }
51       return lFound;
52     }
53
54     bool add(int v) {
55       int topLevel = randomLevel(MaxHeight);
56       Node* preds[MaxHeight], succs[MaxHeight];
```

```
57        while (true) {
58            int lFound = findNode(v, preds, succs);
59            if (lFound != −1) {
60               Node* nodeFound = succs[lFound];
61               if (!nodeFound->marked) {
62                  while (!nodeFound->fullyLinked) { }
63                  return false;
64               }
65               continue;
66            }
67            int highestLocked = −1;
68            try {
69               Node *pred, *succ, *prevPred = null;
70               bool valid = true;
71               for (int level = 0;
72                       valid && (level <= topLevel);
73                       level++) {
74                  pred = preds[level];
75                  succ = succs[level];
76                  if (pred != prevPred) {
77                     pred->lock.lock( );
78                     highestLocked = level;
79                     prevPred = pred;
80                  }
81                  valid = !pred->marked && !succ->marked &&
82                          pred->nexts[level]==succ;
83               }
84               if (!valid) continue;
85
86               Node* newNode = new Node(v, topLevel);
87               for (int level = 0;
88                       level <= topLevel;
89                       level++) {
90                  newNode->nexts[level] = succs[level];
91                  preds[level]->nexts[level] = newNode;
92               }
93
94               newNode->fullyLinked = true;
95               return true;
96            }
97            finally { unlock(preds, highestLocked); }
98         }
99     }
100
101    bool remove(int v) {
102       Node* nodeToDelete = null;
103       bool isMarked = false;
104       int topLevel = −1;
105       Node* preds[MaxHeight], succs[MaxHeight];
106       while (true) {
107          int lFound = findNode(v, preds, succs);
108          if (isMarked ||
109              (lFound != −1 && okToDelete(succs[lFound],lFound))){
110
111             if (!isMarked) {
112                nodeToDelete = succs[lFound];
113                topLevel = nodeToDelete->topLevel;
114                nodeToDelete->lock.lock( );
115                if (nodeToDelete->marked) {
116                   nodeToDelete->lock.unlock( );
117                   return false;
118                }
119                nodeToDelete->marked = true;
120                isMarked = true;
121             }
122             int highestLocked = −1;
123             try {
124                Node *pred, *succ, *prevPred = null;
125                bool valid = true;
126                for (int level = 0;
127                        valid && (level <= topLevel);
128                        level++) {
129                   pred = preds[level];
130                   succ = succs[level];
131                   if (pred != prevPred) {
132                      pred->lock.lock( );
133                      highestLocked = level;
134                      prevPred = pred;
135                   }
136                   valid = !pred->marked && pred->nexts[level]==succ;
```

```
137             }
138             if (!valid) continue;
139
140             for (int level = topLevel; level >= 0; level--) { @)
141                 preds[level]->nexts[level] = nodeToDelete->nexts[level];
142             }
143             nodeToDelete->lock.unlock( );
144             return true;
145         }
146         finally { unlock(preds,highestLocked); }
147      }
148      else return false;
149     }
150   }
151
152   bool okToDelete(Node* candidate, int lFound) {
153      return (candidate->fullyLinked
154             && candidate->topLevel==lFound
155             && !candidate->marked);
156   }
157
158   bool contains(int v) {
159      Node* preds[MaxHeight], succs[MaxHeight];
160      int lFound = findNode(v, preds, succs);
161      return (lFound != -1
162             && succs[lFound]->fullyLinked
163             && !succs[lFound]->marked);
164   }
165
166   }
```

What is claimed follows:

1. A computer-controlled method for concurrently searching a memory containing a skiplist data structure, said method comprising:

locating said skiplist data structure in said memory, said skiplist data structure comprising a plurality of linked lists related by a skiplist invariant, said plurality of linked lists including a first-level linked list and one or more higher-level linked lists, said skiplist data structure further comprising a plurality of nodes each of which comprises a key field, at least one pointer field, and a lock field respectively, each of said plurality of nodes linked to said first-level linked list through said at least one pointer field and ordered responsive to said key field;

performing a search operation for a key in said skiplist data structure while said skiplist data structure is subject to concurrent alteration of said plurality of nodes by a plurality of execution threads configured to maintain said skiplist invariant;

when the key is found in the skiplist data structure during the search operation, recording a result of the search operation that comprises:

a highest level where a node that contains the key was found in the skiplist data structure;

a list of preceding nodes that comprises an identity of a node that precedes the node on each level that comprises a node that contains the key; and a list of succeeding nodes that comprises an identity of a node that follows the node where the key was found on each level that comprises a node that contains the key; and returning a result of said search operation.

2. The computer-controlled method of claim 1, wherein said search operation is characterized as being wait-free.

3. The computer-controlled method of claim 1, wherein at least one of said plurality of nodes further comprises additional data.

4. The computer-controlled method of claim 1, further comprising:

performing an add operation on said skiplist data structure while said skiplist data structure is subject to concurrent alteration of said plurality of nodes by a plurality of execution threads configured to maintain said skiplist invariant, a portion of said plurality of nodes representing a set of elements, said add operation configured to add a new node to said plurality of nodes, said new node added to said set of elements when linked to one of said one or more higher-level linked lists.

5. The computer-controlled method of claim 1, further comprising:

performing an add operation on said skiplist data structure while said skiplist data structure is subject to concurrent alteration of said plurality of nodes by a plurality of execution threads configured to maintain said skiplist invariant, a portion of said plurality of nodes representing a set of elements, said add operation configured to add a new node to said plurality of nodes, said new node added to said set of elements when linked to said first-level linked list.

6. The method of claim 1, wherein each of the plurality of nodes additionally comprises a marked flag that is used to make remove operations for the skiplist data structure appear atomic.

7. An apparatus having a central processing unit (CPU) and a memory coupled to said CPU for concurrently searching said memory containing a skiplist data structure, said apparatus comprising:

a locator logic configured to locate said skiplist data structure in said memory, said skiplist data structure comprising a plurality of linked lists related by a skiplist invariant, said plurality of linked lists including a first-level linked list and one or more higher-level linked lists, said skiplist data structure further comprising a plurality of nodes each of which comprises a key field, at least one pointer field, and a lock field respectively, each of said plurality of nodes linked to said first-level linked list through said at least one pointer field and ordered responsive to said key field;

a search logic configured to perform a search operation for a key in said skiplist data structure while said skiplist data structure is subject to concurrent alteration of said plurality of nodes by a plurality of execution threads configured to maintain said skiplist invariant;

wherein, when the key is found in the skiplist data structure during the search operation, the search logic is configured to record a result of the search operation that comprises:

a highest level where a node that contains the key was found in the skiplist data structure;

a list of preceding nodes that comprises an identity of a node that precedes the node on each level that comprises a node that contains the key; and a list of succeeding nodes that comprises an identity of a node that follows the node where the key was found on each level that comprises a node that contains the key; and a result logic configured to return a result of said search operation.

8. The apparatus of claim 7, wherein said search operation is characterized as being wait-free.

9. The apparatus of claim 7, wherein at least one of said plurality of nodes further comprises additional data.

10. The apparatus of claim 7, further comprising:

an add logic configured to perform an add operation on said skiplist data structure while said skiplist data structure is subject to concurrent alteration of said plurality of nodes by a plurality of execution threads configured to maintain said skiplist invariant, a portion of said plurality of nodes representing a set of elements, said add operation configured to add a new node to said plurality of nodes, said new node added to said set of elements when linked to one of said one or more higher-level linked lists.

11. The apparatus of claim 7, further comprising:

an add logic configured to perform an add operation on said skiplist data structure while said skiplist data structure is subject to concurrent alteration of said plurality of nodes by a plurality of execution threads configured to maintain said skiplist invariant, a portion of said plurality of nodes representing a set of elements, said add operation configured to add a new node to said plurality of nodes, said new node added to said set of elements when linked to said first-level linked list.

12. A non-transitory computer-usable data carrier for concurrently searching a memory containing a skiplist data structure, said product comprising:

a computer-usable data carrier providing instructions that, when executed by a computer, cause said computer to perform a method comprising:

locating said skiplist data structure in said memory, said skiplist data structure comprising a plurality of linked lists related by a skiplist invariant, said plurality of linked lists including a first-level linked list and one or more higher-level linked lists, said skiplist data structure further comprising a plurality of nodes each of which comprises a key field, at least one pointer field, and a lock field respectively, each of said plurality of nodes linked to said first-level linked list through said at least one pointer field and ordered responsive to said key field;

performing a search operation for a key in said skiplist data structure while said skiplist data structure is subject to concurrent alteration of said plurality of nodes by a plurality of execution threads configured to maintain said skiplist invariant;

when the key is found in the skiplist data structure during the search operation, recording a result of the search operation that comprises:

a highest level where a node that contains the key was found in the skiplist data structure;

a list of preceding nodes that comprises an identity of a node that precedes the node on each level that comprises a node that contains the key; and a list of succeeding nodes that comprises an identity of a node that follows the node where the key was found on each level that comprises a node that contains the key; and returning a result of said search operation.

13. The computer-usable data carrier of claim 12, wherein said search operation is characterized as being wait-free.

14. The computer-usable data carrier of claim 12, wherein at least one of said plurality of nodes further comprises additional data.

15. The computer-usable data carrier of claim 12, further comprising:

performing an add operation on said skiplist data structure while said skiplist data structure is subject to concurrent alteration of said plurality of nodes by a plurality of execution threads configured to maintain said skiplist invariant, a portion of said plurality of nodes representing a set of elements, said add operation configured to add a new node to said plurality of nodes, said new node added to said set of elements when linked to one of said one or more higher-level linked lists.

16. The computer-usable data carrier of claim 12, further comprising:

performing an add operation on said skiplist data structure while said skiplist data structure is subject to concurrent alteration of said plurality of nodes by a plurality of execution threads configured to maintain said skiplist invariant, a portion of said plurality of nodes representing a set of elements, said add operation configured to add a new node to said plurality of nodes, said new node added to said set of elements when linked to said first-level linked list.

* * * * *